(12) United States Patent　　(10) Patent No.: US 7,726,218 B2
Furuki　　(45) Date of Patent: Jun. 1, 2010

(54) CLAMP MECHANISM OF THROWAWAY TIP

(75) Inventor: Toshimitsu Furuki, Joso (JP)

(73) Assignee: Mitsubishi Material Corporation, Tokyo (JP)

( * ) Notice: Subject to any disclaimer, the term of this patent is extended or adjusted under 35 U.S.C. 154(b) by 795 days.

(21) Appl. No.: 10/599,319

(22) PCT Filed: Mar. 24, 2005

(86) PCT No.: PCT/JP2005/005422

§ 371 (c)(1),
(2), (4) Date: Dec. 14, 2006

(87) PCT Pub. No.: WO2005/092545

PCT Pub. Date: Oct. 6, 2005

(65) Prior Publication Data

US 2008/0240873 A1　　Oct. 2, 2008

(30) Foreign Application Priority Data

Mar. 26, 2004　(JP) .............................. 2004-090710
Mar. 8, 2005　(JP) .............................. 2005-063641

(51) Int. Cl.
*B23B 27/16*　　(2006.01)
*B23B 29/04*　　(2006.01)
(52) U.S. Cl. ........................................ 82/100; 407/104
(58) Field of Classification Search ................. 82/100; 407/101, 104, 103, 105, 107
See application file for complete search history.

(56) References Cited

U.S. PATENT DOCUMENTS 3,173,191 A　　3/1965　Alexander et al.
3,341,920 A *　9/1967　Kelm .......................... 407/104

(Continued)

FOREIGN PATENT DOCUMENTS

CN　　1140429　　1/1997

(Continued)

OTHER PUBLICATIONS

International Search Report for PCT/JP2005/005422 mailed Jul. 5, 2005.

*Primary Examiner*—Will Fridie, Jr.
(74) *Attorney, Agent, or Firm*—Leason Ellis LLP

(57) ABSTRACT

The present invention relates to a clamp mechanism which prevents a tip body from being greatly cut out by a fitting hole to secure strength of a tip without complicating the shape of a head portion of a clamp member or a fitting hole of a tip body. There is provided a clamp mechanism of a tip for pressing the tip, in which a fitting hole is formed through a tip body, by the use of a clamp member having a shaft portion inserted into the fitting hole and a head portion with an outer diameter equal to or larger than that of the shaft portion and thus clamping the tip to a tip fitting seat. In the clamp member, a section, which is perpendicular to the central axis line, of the back surface of the head portion has a circle shape centered at the central axis line. In the tip body of the tip, the head portion of the clamp member can pass through the fitting hole, and a contact portion with which a part of the back surface of the head portion comes in contact at the time of advancing the clamp member is formed in an opening of the fitting hole.

10 Claims, 13 Drawing Sheets

U.S. PATENT DOCUMENTS

| | | | |
|---|---|---|---|
| 5,314,269 A * | 5/1994 | Arai et al. | 407/42 |
| 6,050,751 A * | 4/2000 | Hellstrom | 407/104 |
| 6,935,814 B2 * | 8/2005 | Nagaya et al. | 407/100 |
| 7,179,021 B2 * | 2/2007 | Shaheen | 407/107 |
| 2003/0165362 A1 | 9/2003 | Hecht | |

FOREIGN PATENT DOCUMENTS

| | | |
|---|---|---|
| CN | 1196987 | 10/1998 |
| EP | 0873808 | 10/1998 |
| JP | 48-12675 A | 2/1973 |
| JP | 57-194803 A | 11/1982 |
| JP | 11-19808 A | 5/1989 |
| JP | 07-164213 A | 6/1995 |
| WO | 96/12592 | 5/1996 |

* cited by examiner

CLAMP MECHANISM OF THROWAWAY TIP

CROSS-REFERENCE TO RELATED APPLICATIONS

This application is a U.S. National Phase application under 35 U.S.C. §371 of International Patent Application No. PCT/JP2005/005422, filed Mar. 24, 2005, which claims priority to Japanese Patent Application No. 2004-090710, filed Mar. 26, 2004, and Japanese Patent Application No. 2005-063641, filed Mar. 8, 2005. The International Application was published in Japanese on Oct. 6, 2005 as WO 2005/092545 A1 under PCT Article 21(2). Each of these applications are hereby incorporated by reference as if set forth in their entirety.

FIELD OF INVENTION

The present invention relates to a clamp mechanism of a tip for detachably fitting a throwaway tip (hereinafter, simply referred to as a tip), in which a fitting hole is formed through a tip body, into a tip fitting seat formed in a tool body by the use of a clamp member, and more particularly, to a clamp mechanism of a tip in which the tip can be attached to or detached from a tool body without completely separating a clamp member from the tool body.

BACKGROUND ART

In such a kind of clamp mechanisms, it is generally known to press all or a part of an opening of a fitting hole with a head portion and to clamp a tip, by setting the outer diameter of a shaft portion of a clamp member to be smaller than the inner diameter of the fitting hole formed in a tip body, setting the outer diameter of the head portion formed at an end of the shaft portion to be larger than that, forming a screw portion inserted into a tip fitting seat of a tool body at the other end of the shaft portion, positioning the tip body onto the tip fitting seat, and then inserting the clamp member into the fitting hole from the screw portion. However, in the traditional clamp mechanism, since the clamp member should be also detached from the tool body when the tip is detached, the detachment work is troublesome and the detached clamp member may be lost.

In Japanese Unexamined Utility Model Publication No. 1973-12675 ("JP '675"), PCT Japanese Translation Patent Publication No. 2002-512891 ("JP '891"), and U.S. Patent Publication No. 2003/0165362 ("US '362"), there have been suggested clamp mechanisms in which a head portion of a clamp member, disposed in a tool body and can advance and retreat, has a section with a non-circular cross section. The section has a protrusion protruded from the outer circumference of a shaft portion, such as a petal shape, a triangular shape, or a cross shape, but not a circular shape, in which a concave portion through which the protrusion can pass and a convex portion which engages with the protrusion are alternately formed in the circumferential direction on the inner circumference of an opening of a fitting hole. In such clamp mechanisms, at the time of detaching a tip, the clamp member is protruded, and the tip is pulled out by rotating a tip body or a clamp member so as to position the protrusion and the concave portion with respect to each other. On the other hand, at the time of clamping the tip, the head portion is allowed to pass through the fitting hole in a state where the protrusion and the concave portion are positioned with respect to each other, the tip body or the clamp member is rotated so as to position the protrusion and the convex portion with respect to each other, and then the convex portion is pressed and clamped by the protrusion by inserting the clamp member so as to advance the clamp member toward a tip fitting seat.

In Japanese Unexamined Patent Publication No. 1999-19808 ("JP '808"), there has been suggested a clamp mechanism in which a clamp hole portion, through which a shaft portion of a clamp member having a screw portion can pass but a head portion cannot pass, is formed in a tip body; a passing hole, through which the head portion can pass, is formed on at least one side of an opening of the clamp hole; the shaft portion can pass between the clamp hole and the passing hole; the tip body is fitted to the tip fitting seat by allowing the head portion to pass through the passing hole at the time of fitting a tip in a state where a clamp member inserted into the tip fitting seat is not completely detached therefrom but is loosened; the tip body is brought into contact with the wall surface of the tip fitting seat so as to position the tip body and to allow the shaft portion to pass through the clamp hole by allowing the tip body to slide; and then the opening of the clamp hole is pressed with the head portion to clamp the tip by inserting the clamp member in a screw manner.

SUMMARY OF THE INVENTION

Problems to be Solved by the Invention

However, as described in JP '675, JP '891, and US '362, in the clamp mechanisms in which the protrusion is formed in the head portion of the clamp member and the concave and convex portions are formed in the fitting hole of the tip body, the shape of the head portion of the clamp member and the shape of the fitting hole of the tip body are complicated and the tip can be attached or detached only if the convex portion of the fitting hole is accurately positioned with respect to the rotational position of the protrusion at the time of fitting the tip and the concave portion is accurately positioned with respect to the rotational position of the protrusion at the time of detaching the tip. Accordingly, a simple clamp member such as a clamp screw in which a screw portion is formed on the end of the shaft portion opposite to the head portion cannot be used, since the clamp member rotates and moves toward the tip fitting seat as a whole at the time of fitting the tip and thus it is difficult to position the protrusion and the convex portion with respect to each other. In addition, since the structure for allowing the clamp member to advance and retreat at the time of fitting the tip is complicated, it is not possible to avoid increase in cost.

On the other hand, in the clamp mechanism described in JP '808, the clamp hole through which the shaft portion can pass communicates with the fitting hole of the tip body so as to be adjacent to the passing hole with a large diameter through which the head portion of the clamp member can pass, the portion of the tip body cut off to form the fitting hole is enlarged to deteriorate the strength of the tip, thereby causing destruction of the tip body in some cases. In the clamp mechanism described in JP '808, as described above, since the tip body is brought into contact with the wall surface of the tip fitting seat and is positioned by allowing the tip body in which the head portion of the clamp member passes through the passing hole to slide, the shaft portion is allowed to pass through the clamp hole, and then the clamp member is inserted in a screw manner to clamp the tip, the tip body is supported only by friction based on a pressing force of the head portion of the clamp member in a direction opposite to the sliding direction of the tip body, that is, in a direction against the wall surface of the tip fitting seat. Accordingly, when a large force acts in the direction at the time of cutting or the like, the tip can easily depart and move.

The present invention is contrived in view of the above-mentioned problems. It is a feature of a preferred embodiment of the present invention to provide a clamp mechanism of a tip in which the shape of the head portion of the clamp member or the shape of the fitting hole of the tip body is not complicated and the tip body is prevented from being greatly cut off by the fitting hole, thereby securing the strength of the tip. Another feature of a preferred embodiment of the present invention is to provide a clamp mechanism in which the structure for advancing the clamp member toward the tip fitting seat at the time of detaching or attaching the tip or clamping the tip can be simplified and in which the tip can be strongly and satisfactorily supported in the direction against the wall surface of the tip fitting seat when the tip body is brought into contact with the wall surface and is positioned.

In order to solve the above-mentioned problems and accomplish the above-mentioned objects, according to an aspect of the present invention, there is provided a clamp mechanism of a tip for pressing the tip, in which a fitting hole is formed through a tip body, by the use of a head portion of a clamp member having a shaft portion inserted into the fitting hole and the head portion with an outer diameter larger than that of the shaft portion and thus clamping the tip to a tip fitting seat by allowing the clamp member to advance toward the tip fitting seat of a tool body in the central axis direction of the shaft portion. In the clamp member, a section, which is perpendicular to the central axis direction, of the back surface of the head portion has a circle shape centered at the central axis line. In the tip body of the tip, the head portion of the clamp member can pass through the fitting hole, and a contact portion with which a part of the back surface of the head portion comes in contact when the clamp member is allowed to advance is formed in an opening of the fitting hole.

In the above-mentioned clamp mechanism of the present invention, at the time of clamping the tip, the tip body is mounted on the tip fitting seat by allowing the head portion to pass through the fitting hole of the tip body while the clamp member is fitted to the tool body in the state where the clamp member is allowed to slightly retreat from the tip fitting seat at the time of clamping the tip, the clamp member is then allowed to advance so as to bring a part of a back surface of the head portion into contact with the contact portion of the opening of the fitting hole and press the contact portion. Accordingly, at the time of detaching and attaching the tip, it is not necessary to separate the clamp member from the tool body and the back surface of the head portion of the clamp member may have a circular section described above, the fitting hole of the tip body may have a minimum circular section through which the head portion can pass. As a result, it is possible to simplify the shape of the head portion of the clamp member and the shape of the fitting hole of the tip body, thereby reducing the cost for the clamp mechanism. Specifically, it is possible to minimize the portion of the tip body cut off by the fitting hole, to secure the strength of the tip, and to prevent the destruction thereof, thereby elongating the life time of the tip. In addition, in order to more surely prevent the destruction of the tip body, the contact portion of the tip body may have a crescent shape which is convex from the inner circumference of the fitting hole toward the outer circumference as seen in the direction along the center line of the fitting hole, thereby reducing the cut-off portion of the tip body.

In order to advance the clamp member toward the tip fitting seat to clamp the tip in which the head portion of the clamp member has passed through the fitting hole. For example, as described in JP '675, JP '891, and US '362, the structure for allowing the clamp member to advance and retreat without varying the rotational position of the clamp member around the central axis line of the shaft portion can be employed. However, since the clamp member of the above-mentioned clamp mechanism of the present invention presses and clamps the tip body by bringing a part of the head portion having a circular section into contact with the contact portion on the opening of the fitting hole, the clamp member of the present invention can clamp the tip body regardless of the rotational position of the clamp member around the axial line. That is, since a screw portion inserted into the tool body is disposed as the clamp member at the end of the shaft portion opposite to the head portion, it is possible to use the clamp member which advances toward the tip fitting seat while rotating over the whole circumference of the central axis line, that is, a simple clamping screw corresponding to the back shape of the head portion. As a result, by using such a clamp member, it is possible to sufficiently secure the pressing force at the time of clamping the tip body and to further simplify the structure of the clamp mechanism for allowing the clamp member to advance and retreat at the time of attaching and detaching the tip, thereby further reducing the cost.

Specifically, when the tip body is brought into contact with the wall surface of the tip fitting seat for the purpose of positioning, the central axis line of the clamp member may be tilted with respect to the center line of the fitting hole. That is, by tilting the central axis line in the direction in which the central axis line is spaced apart from the center line of the fitting hole toward the tip fitting seat to ward which the clamp member is allowed to advance at the time of clamping, the tip body is pressed toward the wall surface by the back surface of the head portion of the clamp member, thereby preventing the tip body from departing and moving toward the opposite side of the wall surface. In the clamp member of the present invention, since the large-diameter portion having an outer diameter larger than that of the fitting hole is provided at the end of the shaft portion opposite to the head portion, the tip body can be floated from the tip fitting seat by the use of the large-diameter portion by retreating the clamp member from the tip fitting seat at the time of detaching the tip. Accordingly, the detachment work can be more easily performed.

In addition, as described above, when the central axis line of the clamp member of the present invention is tilted about the center line of the fitting hole, a portion of the contact portion, which is located in a plane including the central axis line of the clamp member and the center line of the fitting hole, may be more convex in the direction along the central axis line than other portions. In this case, the back surface of the head portion of the clamp member comes in contact with the contact portion to press the tip body at a portion, on the plane which is most convex along the central axis line, of the contact portion as the clamp member advances toward the tip fitting seat along the central axis line. Accordingly, the pressing force from the clamp member of the present invention can be efficiently delivered without being distributed, thereby clamping the tip. Specifically, when the clamp member is the above-mentioned clamp screw, it is possible to prevent the partial abrasion.

Similarly, when the central axis line of the clamp member of the present invention is tilted about the center line of the fitting hole, a plurality of fitting holes having the center lines parallel to each other may be formed in the tip body, a plurality of clamp members corresponding to the fitting holes may be provided in the tool body, and the tilted central axis lines of the clamp members may extend in a parallel direction or in a direction intersecting each other at an intersection angle of 5° or less as seen in the direction along the center lines. In this case, the pressing directions of the plurality of clamp members of which the central axis lines are tilted can be arranged in a constant direction to bring the tip body into contact with the wall surface or position the tip body, thereby improving the accurate repeated positioning of the edge of the tip. In this way, when a plurality of fitting holes is formed in the tip body and a plurality of clamp members is provided in the tool body, a mark indicating an order of allowing the clamp members to advance (e.g., inserting the clamp screw in a screw manner) toward the tip fitting seat may be provided in the tip body. In this case, it is possible to more surely guide the tip body in the constant direction and to position the tip body, thereby further improving the accurate repeated positioning of the edges.

DETAILED DESCRIPTION OF THE DRAWINGS

Figure 3:
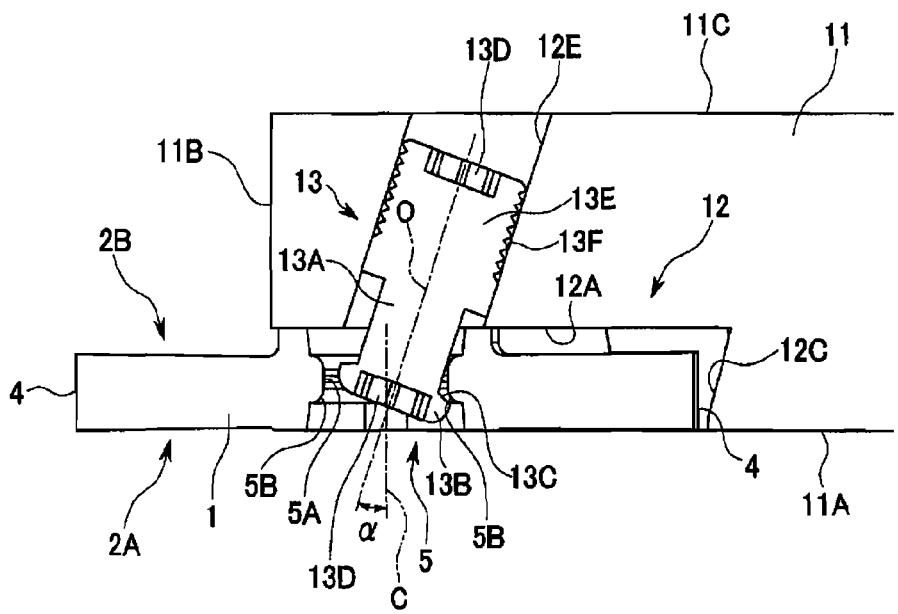
FIG. 3 is a cross-sectional view taken along Line Z-Z of FIG. 1, which illustrates a state in which a tip is clamped according to the first embodiment of the invention.
Figure 4:
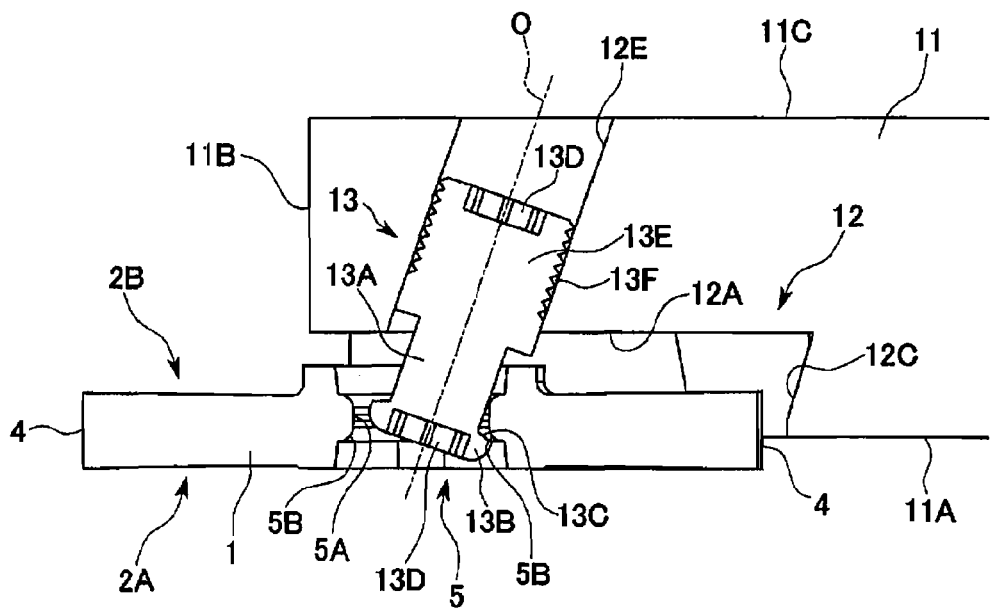
FIG. 4 is a diagram illustrating a state in which a clamp member 13 is loosened from the state shown in FIG. 3.
Figure 5:
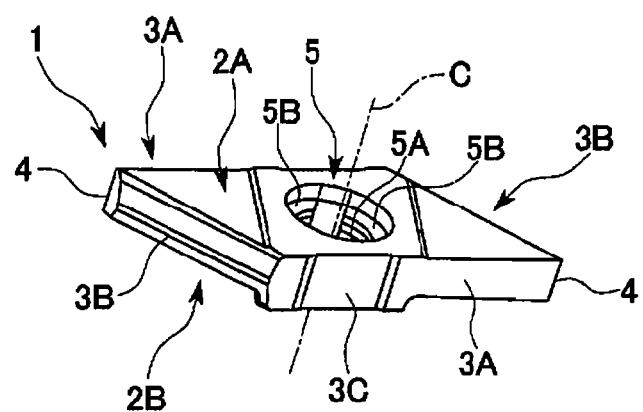
FIG. 5 is a perspective view of the clamped tip according to the first embodiment.
Figure 6:
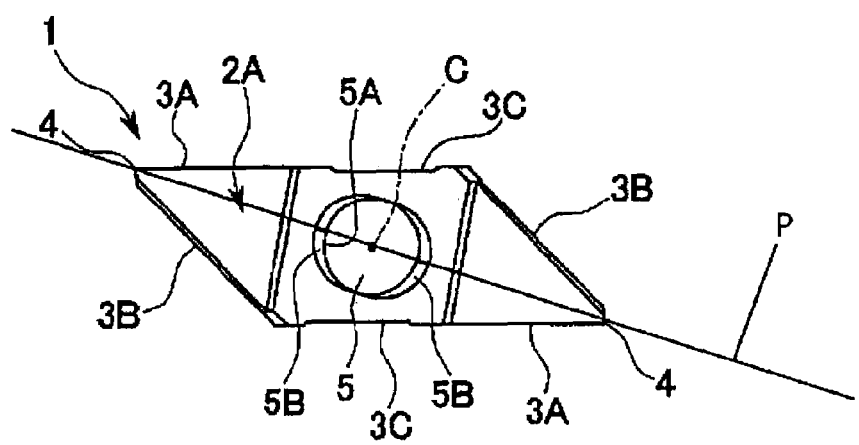
FIG. 6 is a lateral view of the tip shown in FIG. 5.
Figure 7:
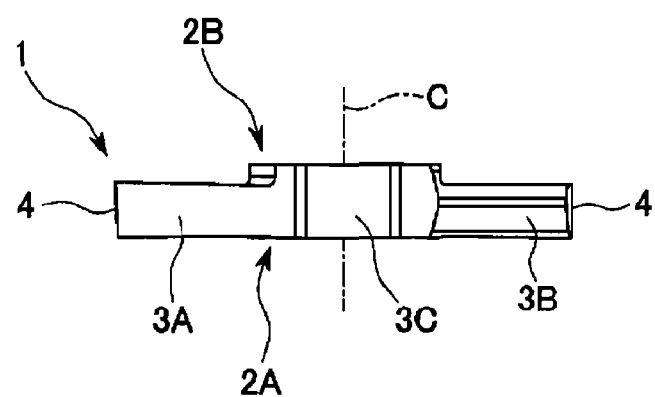
FIG. 7 is a plan view of the tip shown in FIG. 5.

FIGS. 1 to 4 illustrate a throwaway grooving bite to which a clamp mechanism according to a first embodiment of the present invention is applied, and FIGS. 5 to 7 illustrate a tip which is fitted to the clamp mechanism according to the first embodiment. A tip body 1 of the tip is formed in a parallelogram panel shape out of a hard material such as cemented carbide, and has a pair of side surfaces 2A and 2B forming a parallelogram and pairs of circumferential surfaces 3A and 3B which are alternately arranged on the circumference thereof in the circumferential direction. The circumferential surfaces are rotationally symmetrical by 180° about a center line C which passes through the intersections between diagonal lines of both parallelogram side surfaces 2A and 2B and extends in the thickness direction (in the vertical direction in FIG. 7) of the panel-shaped tip body 1. A cutting edge 4 is formed in each intersection ridgeline of the circumferential surfaces 3A and 3B which intersect each other in a pair of acute ends of the side surfaces 2A and 2B, and two cutting edges 4 of one tip body 1 can be utilized.

Accordingly, one of the circumferential surfaces 3A and 3B (the longitudinal circumferential surface 3A in the first embodiment) serves as a rake face of the cutting edge 4, and the other (the short circumferential surface 3B in the first embodiment) serves as a clearance surface. Both side surfaces 2A and 2B have an inclined surface in which portions close to the acute ends on which the cutting edges 4 gradually retreat in the thickness direction of the tip body 1 as it goes to the center of the side surfaces 2A and 2B from the acute ends, thereby giving clearance to the cutting edge 4. In the circumferential surface 3A serving as the rake face of the cutting edge 4, a portion extending to the cutting edge 4 and a portion intersecting the circumferential surface 3B at an obtuse angle form a flat plane located in the same plane parallel in the thickness direction, and a concave portion 3C slightly retreating from the flat plane is formed between the portions. In the circumferential surface 3B serving as the clearance surface of the cutting edge 4, the section other than a portion close to the cutting edge 4 has a mountain shape of a substantial triangle.

On the other hand, the center portions of the side surfaces 2A and 2B of the tip body 1 form a flat plane perpendicular to the thickness direction, the center portion of the side surface 2B on the inner side of the tip body 1 is protruded by a step, and a fitting hole 5 is formed between the center portions of the side surfaces 2A and 2B so as to pass through the tip body 1 in the thickness direction. In the fitting hole 5, the substantial center portion in the thickness direction of the tip body including the portion protruded by a step on the side surface 2B becomes a circular minimum-diameter portion 5A centered about the center line C and an opening of the fitting hole 5 directed to the outer side of the tip body along the center line C from the minimum-diameter portion 5A has an inner diameter, along the diagonal line connecting the acute ends of the parallelogram of the side surface 2A, which increases toward the side surface 2A. Here, the inner diameter in the direction perpendicular to the diagonal line is substantially equal to that of the minimum-diameter portion 5A.

The section of the opening of the fitting hole 5 along the diagonal line connecting the acute ends form a convex quarter circle shape toward the side surfaces 2A and 2B of the tip body 1 from the minimum-diameter portion 5A as shown in FIGS. 3 and 4, that is, a bell shape in which the inner diameter in the diagonal direction increases and the inner diameter increases in a straight line shape having a constant slope, thereby forming a concave portion indented from the side surfaces 2A and 2B. As seen along the center line C, in a portion of which the section forms the convex circle shape, the width with which the inner diameter increases from the inner circumference of the minimum-diameter portion 5A which is the inner circumference of the fitting hole 5 in the diagonal line is the maximum, as shown in FIG. 6, and the width gradually decreases as it goes apart from the diagonal line in the direction perpendicular to the diagonal line around the center line C, thereby forming a crescent shape which is convex from the inner circumference of the fitting hole 5 toward the outer circumference. Accordingly, in the opening of the fitting hole 5, as shown in FIG. 6, the opening edges toward the side surfaces 2A and 2B form an elliptical shape having a major axis along the diagonal line as seen along the center line C and form a crescent shape as seen from the center line C on the side surface 2A. A pair of which the section has the convex circle shape serves as the contact portion 5B in the first embodiment. In the first embodiment, the fitting hole 5 is symmetrical about a plane P perpendicular to the center line C at the center in the thickness direction of the tip body 1 including the portion of the side surface 2B protruded by a step.

Figure 1:
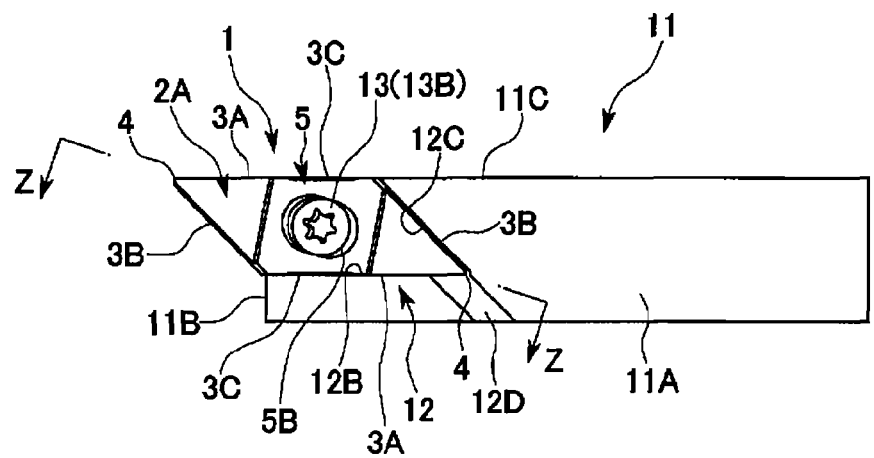
FIG. 1 is a lateral view illustrating a throwaway grooving bite employing a clamp mechanism according to a first embodiment of the present invention.
Figure 2:
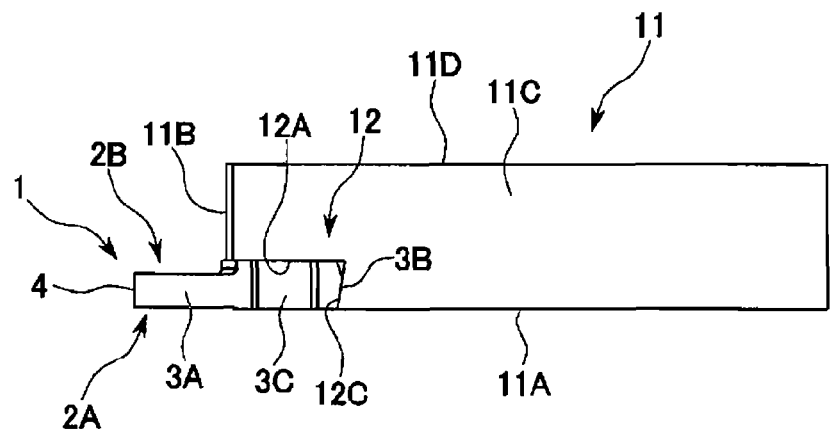
FIG. 2 is a plan view of the grooving bite shown in FIG. 1.

The tool body 11 of the throwaway bite detachably fitted with the tip has a rectangular pillar as shown in FIGS. 1 and 2 in the first embodiment, and the upper portion of a longitudinal end (left in FIGS. 1 and 2) of a side surface 11A thereof is indented to serve as a tip fitting seat 12. Here, the tip fitting seat 12 includes a fitting seat bottom 12A indented parallel to the side surface 11A, a fitting seat wall 12B which is raised vertically from the bottom 12A and which is perpendicular to the side surface 11A and the end surface 11B of the tool body 11 and parallel to the upper surface 11C of the tool body 11, and a fitting seat wall 12C which is raised to intersect the fitting seat bottom 12A at an acute angle and to be oblique toward the end as it goes to the side surface 11A as shown in FIGS. 2 to 4 and which extends oblique in the direction intersecting the wall 12B at an acute angle and reaches the upper surface 11C as shown in FIG. 1.

The intersection angles of the fitting seat walls 12B and 12C as seen from the side surface 11A are equal to the intersection angle which is formed at the acute ends of the side surfaces 2A and 2B by the circumferential surfaces 3A and 3B of the tip body 1. In addition, the intersection angle formed by the wall 12C and the bottom 12A is equal to the angle between the slope portion, close to the side surface 2A, of the mountain-shaped section of the circumferential surface 3B serving as the clearance surface of the tip body 1 and the center of the plane shape of the side surface 2B. Accordingly, the tip body 1 is seated on the tip fitting seat 12 by opposing the side surface 2B to the bottom 12A, bringing the portion protruded by a step into close contact with the bottom, bringing one circumferential surface 3A into contact with the fitting seat wall 12B, bringing the slope portion of the circumferential surface 3B, intersecting the circumferential surface 3A at the cutting edge 4, into contact with the fitting seat wall 12C, and protruding a cutting edge 4 opposite to the cutting edge 4 from the end of the tool body 11. Therefore, the flat plane protruded by a step at the center of the side surface 2B becomes a seating surface onto the fitting seat bottom 12A. At corner at which the fitting seat walls 12B and 12C intersects each other, a clearance portion 12D for avoiding interference with the cutting edge 4 is formed so as to extend along the wall 12C tilted about the wall 12B, as shown in FIG. 1 in the embodiment.

As shown in FIGS. 3 and 4, a clamp member 13 having a shaft portion 13A which is inserted into the fitting hole 5 of the tip body 1 and a head portion 13B with an outer diameter larger than that of the shaft portion 13A is fitted to the tool body 11. Here, the clamp member 13 can advance and retreat in the direction along the central axis line O of the shaft portion 13A. By advancing the clamp member 13 toward the tip fitting seat 12 along the central axis line O, the back surface 13C of the head portion 13B comes in contact with the contact portion 5B of the opening of the fitting hole 5, thereby clamping the tip body 1. The back surface 13C of the head portion 13B of the clamp member 13 is formed to have a circular section perpendicular to the central axis line O, and the head portion 13B of the clamp member 13 can pass through the fitting hole 5 of the tip body 1.

Here, the shaft portion 13A of the clamp member 13 is formed in a cylinder shape centered on the axis line O. The head portion 13B is formed integrally with the shaft portion 13A at one end of the clamp member 13 (left-lower side in FIGS. 3 and 4) and is formed in a disk shape which is flat in the direction along the axial line O around the axis line O. The back surface 13C has a circular cone shape in which the outer diameter decreases toward the other end of the clamp member 13 (toward the shaft portion 13A, that is, toward the upper-right side in FIGS. 3 and 4), so that the section perpendicular to the axis line O has a circle shape as described above. Accordingly, in the fitting hole 5 of the tip body 1, the inner diameter of the minimum-diameter portion 5A is smaller than the outer diameter of the head portion 13B having a disk shape of the clamp member 13. The angle of the back surface 13C having the circular cone shape about the axis line O is 45° or more in the embodiment. The circumferential portion of the end surface of the head portion 13B forms a semi-circular shape in the section taken along the axis line O, the center portion is a flat plane perpendicular to the axis line O, and an inserting hole into which a working tool such as a wrench is inserted so as to revolve the clamp member 13 around the axis line O is formed in the center portion.

At the end of the clamp member 13 opposite to the head portion 13B of the shaft portion 13A, that is, the other end of the clamp member 13, a cylindrical large-diameter portion 13E which is centered on the axis line O and has an outer diameter larger than the inner diameter of the minimum-diameter portion 5A is formed integrally with the shaft portion 13A. Accordingly, the large-diameter portion 13E has an outer diameter larger than that of the shaft portion 13A or the head portion 13B, and is a portion having the largest diameter of the clamp member 13. A male screw 13F is formed on the outer circumference of the large-diameter portion 13E, and an inserting hole 13D into which the working tool such as wrench is inserted so as to revolve the clamp member 13 around the axis line O is formed in the other end surface of the large-diameter portion 13E.

A screw hole 12E penetrating from the fitting seat bottom 12A of the tip fitting seat 12 to the side surface 11D of the tool body 11 opposite to the side surface 11A is formed in the tool body 11 so as to be open correspondingly to the opening, close to the side surface 2B, of fitting hole 5 of the tip body 1 seated as described above. Accordingly, the clamp member 13 is fitted to the tool body 11 by inserting the male screw portion 13F on the outer circumference of the large-diameter portion 13E into the screw hole 12E so as to protrude the shaft portion 13A and the head portion 13B from the fitting seat bottom 12A. Therefore, in this way, by inserting working tools into the inserting holes and inserting the male screw portion 13F into the screw hole 12E in the state where the head portion 13B is protruded from the fitting seat bottom 13A, the clamp member 13 advances toward the tip fitting seat 12 so that the large-diameter portion 13E is indented from the fitting seat bottom 12A as shown in FIG. 3. On the contrary, by loosening the male screw portion 13F, the clamp member 13 retreats from the tip fitting seat 12 so that the large-diameter portion 13E is protruded from the fitting seat bottom 12A.

As shown in FIGS. 3 and 4, the screw hole 12E is tilted with respect to the fitting seat bottom 12A of the tip fitting seat 12. The central axis line O of the clamp member 13 in which the male screw portion 13F is inserted into the screw hole 12E is tilted with respect to the fitting seat bottom 12A. Accordingly, the screw hole 12E is tilted with respect to the center line C of the tip body 1 seated on the tip fitting seat 12. Therefore, the direction in which the axis line O is tilted toward the advancement direction (inserting direction) of the clamp member 13 at the time of clamping from the fitting seat bottom 12A is a direction directed to the intersection between the fitting seat walls 12B and 12C along the section indicated by the cutting line Z-Z in FIG. 1 as seen from the side surface opposed to the fitting seat bottom 12A of the tip fitting seat 12, that is, the diagonal direction of the parallelogram of the side surface 2A of the tip body 1 seated on the tip fitting seat 12, a major axis direction of the opening edge of the fitting hole having an elliptical shape as seen from the side surface 2A, or a direction directed to the opposite side of the cutting edge 4 used for cutting along the direction in which the width of the contact portion 5B having the crescent shape as seen along the center line C. An angle α of the tilted central axis line O of the clamp member 13 about the direction perpendicular to the fitting seat bottom 12A, that is, the direction along the center line C of the tip body 1 seated on the tip fitting seat 12, is in the range of 5° to 40° in the embodiment.

In the clamp mechanism having the above-mentioned structure, in the state where the male screw portion 13F is loosened from the screw hole 12E as described above without completely pulling out the clamp member 13 from the tool body 11 and the shaft portion 13A and the head portion 13B are slightly protruded from the fitting seat bottom 12A, by allowing the head portion 13B to pass through the fitting hole 5, seating the tip body 1 on the tip fitting seat 12, and then inserting the male screw portion 13F into the screw hole 12E, the head portion 13B of the clamp member 13 is advanced toward the tip fitting seat 12. Then, as shown in FIG. 3, the back surface 13C of the head portion 13B having a circular section comes in contact with the contact portion 5B close to the opposite side (the side toward the axis line O is tilted about the center line C) of the cutting edge 4 protruded from the end of the tool body 11 for use in cutting among a pair of contact portions 5B of the fitting hole 5 and presses the tip body 1 toward the fitting seat bottom 12A, thereby clamping the tip body 1 to the tip fitting seat 12. On the contrary, at the time of detaching the tip, at the position in which the pressing due to the contact with the back surface 13C is released and the head portion 13B can pass through the fitting hole 5 by loosening the clamp member 13 and retreating the shaft portion 13A and the head portion 13B from the tip fitting seat 12, it is possible to detach the tip without pulling out and removing the clamp member 13 from the tool body 11, as shown in FIG. 4.

Accordingly, according to the clamp mechanism having the above-mentioned structure, since it is not necessary to detach the clamp member 13 from the tool body 11 at the time of detaching the tip, it is possible to easily perform the detachment and attachment work and thus there is not possibility of losing the detached clamp member 13. In addition, since the back surface 13C of the head portion 13B of the clamp member 13 pressing the tip body 1 can have a disk shape of which the section is circular and the fitting hole 5 of the tip body 1 can have the minimum-diameter portion 5A of which the section transmitting the head portion 13B is circular, it is possible to simplify the shape of the clamp member 13 or the tip body 1, thereby reducing the cost for the clamp mechanism. Since the fitting hole 5 has the circular minimum-diameter portion 5A and the contact portions 5B are formed in the opening thereof, it is possible to reduce the portion of the tip body 1 cutting out by the fitting hole 5. Accordingly, it is possible to secure the strength of the tip body 1 and to prevent the destruction thereof due to a load at the time of cutting, thereby elongating the lift time of the tip and promoting the smooth cutting work.

In the first embodiment, when the contact portions 5B are formed in the opening of the fitting hole 5, the contact portions 5B are formed as concave portions indented from the side surface 2A so as to form the crescent shape which is convex from the inner diameter of the minimum-diameter portion 5A as the inner circumference of the fitting hole 5 toward the outer circumference as seen in the direction along the center line C of the fitting hole 5. Accordingly, in the first embodiment, since the contact portions 5B coming in contact with the back surface 13c can be formed by the size, corresponding to the back surface 13C coming in contact with the contact portions 5B, in the opening of the fitting hole 5 in which the disk-shaped head portion 13B having the back surface 13C with a circular section passes through the minimum-diameter portion 5A, it is possible to further suppress the portion of the tip body 1 cut out by the fitting hole 5 including the contact portions 5B, thereby more surely preventing the destruction of the tip body 1.

In the first embodiment, the contact portions 5B are formed in a bell shape which is indented in the section taken along the center line C of the fitting hole 5 of the tip body 1 so as to form a quarter convex circle shape, but may be formed in, for example, a countersink shape with a concave circular-cone shape which is directed to the side surface 2B serving as the seating surface on the fitting seat bottom 12A of the tip fitting seat 12 as it goes to the inner circumference with the same slope as the slope of the back surface 13C of the head portion of the clamp member 13 which comes in contact with the contact portions 5B. The crescent shape formed toward the center line C by the contact portions 5B may be a longitudinal circular shape obtained by deviating the inner circumference of the minimum-diameter portion 5A, in addition to the elliptical shape like in the first embodiment. Like in the first embodiment, when the clamp member 13 having the disk-shaped head portion 13B is fitted so that the central axis line O is tilted with respect to the center line C of the fitting hole 5, the head portion 13B has a flat elliptical shape having a minor axis in the direction in which the central axis line O is tilted (in the major axis direction of the ellipse formed by the contact portions 5B in the embodiment) as seen in the direction along the center line C. Accordingly, the minimum-diameter portion 5A of the fitting hole 5 transmitting the head portion 13B can be formed in an elliptical shape having a minor axis in the direction in which the central axis line O is tilted as seen in the direction along the center line C, and thus the portion of the tip body 1 cut out by the fitting hole 5 can be further reduced. As a result, it is possible to improve the destruction preventing effect result from the further increase in strength of the tip.

The contact portions 5B and the back surface 13C of the head portion 13B of the clamp member 13 may come in contact with each other over the whole circumference of the respective contact portions 5B, may come in contact with each other only at one position of the place in which the width from the inner circumference of the minimum-diameter portion 5A of each crescent contact portion 5B (the place in the major axis of the contact portions 5B forming an elliptical shape), or may come in contact with each other at both positions in the circumferential direction of the fitting hole 5 with the place having the largest width therebetween. Among these, when the head portion 13B comes in contact with the contact portions 5B at two positions in the circumferential direction with the place therebetween in which the width of the contact portions 5B, as shown in FIG. 3, a slight gap exists between the place in which the contact portions 5B have the largest width in the section (Z-Z section) taken along the major axis direction of the ellipse and the back surface 13C of the head portion 13B.

On the other hand, as the structure for advancing and retreating the clamp member 13 with respect to the tip fitting seat 12 in the clamp mechanism, a structure in which the clamp member is advanced and retreated without changing the rotational position around the central axis direction of the shaft portion of the clamp member as described in JP '675, JP '891, and US '362 can be use. However, as described above, since the tip body 1 is clamped regardless of the rotational position around the central axis line O of the clamp member 13 by bringing the back surface 13C of the head portion 13B of the clamp member 13 with a circular section into contact with the contact portions 5B, it is possible to employ the structure in which the clamp member 13 advances and retreats while rotating over the entire circumference of the central axis line O, that is, the structure in which the clamp member 13 advances and retreats by means of the screw coupling between the male screw portion 13F and the screw hole 12E like in the embodiment. Accordingly, it is possible to clamp the tip body 1 with a simpler structure and a sufficient pressing force in comparison with the structure in which the clamp member advances and retreats without changing the rotational position of the clamp member as in JP '675, JP '891, and US '362, thereby further reducing the cost and smoothly performing the cutting work.

In the first embodiment, the central axis line O of the clamp member 13 is tilted with respect to the center line C of the fitting hole 5 of the tip body 1. Accordingly, when the back surface 13C of the head portion 13B is brought into contact with the contact portions 5B to press the tip body 1 by advancing the clamp member 13 toward the tip fitting seat 12 in the direction along the axis direction O, the tip body 1 is pressed toward the fitting seat bottom 12A of the tip fitting seat 12 in the direction along, and is also pressed in the direction in which the axis line O goes apart from the center line C toward the tip fitting seat 12 the central axis line C in the direction perpendicular to the center line C. Accordingly, like in the first embodiment, by forming the walls 12B and 12C of the tip fitting seat 12 in the direction, it is possible to more strongly clamp the tip body with the fitting seat walls 12B and 12C and the fitting seat bottom 12A, thereby preventing, for example, a situation that the tip body 1 moves against the walls 12B and 12C at the time of cutting like in the clamp mechanism described in JP '808.

When the tilt angle α of the central axis line O of the tilted clamp member 13 about the center line C of the fitting hole 5 of the tip body 1 is too small, the pressing force for pressing the tip body 1 on the walls 12B and 12C is decreased and thus the above-mentioned effect is not sufficient. On the other hand, when the tilt angle α is too large, the pressing force for pressing the tip body 1 on the fitting seat bottom 12A and thus the stability in fitting the tip can be damaged. Accordingly, the tilt angle α of the central axis line O about the center line C is preferably in the range of 5° to 40° like in the embodiment. In this way, when the clamp member 13 is tilted and fitted, the clearance portion for avoiding the interference of the tilted clamp member 13 with the shaft portion 13A is formed in the opening of the fitting hole 5 close to the side surface 2B serving as the seating surface on the tip fitting seat 12, for example, so that the fitting hole 5 is symmetrical inside and outside like in the embodiment, and is formed preferably in the shape of an ellipse elongated in the direction in which the clamp member 13 is tilted.

In the clamp mechanism according to the first embodiment, the large-diameter portion 13E having a diameter larger than that of the fitting hole 5 of the tip body 1 and larger than that of the shaft portion 13A or the head portion 13B is formed on the end (the other end) of the clamp member 13 opposite to the head portion 13B at one end of the shaft portion 13A, and the male screw portion 13R is formed on the outer circumference of the large-diameter portion 13E. Accordingly, when the tip fitted to the tool body 11 is detached therefrom, by loosening the male screw portion 13F from the screw hole 12E and retreating the clamp member 13 from the tip fitting seat 12, the large-diameter portion 13E can be protruded from the fitting seat bottom 12A to push up the center of the side surface 2B serving as the seating surface of the tip body 1 as shown in FIG. 4, thereby floating the tip body 1 from the tip fitting seat 12. As a result, as described above, even when the tip body 1 is strongly fitted to the tip fitting seat 12 by tilting the central axis line O and strongly pressing the tip body 1 on the walls 12B and 12C, it is possible to easily detach the tip body 1 by retreating the clamp member 13 at the time of interchanging the tip, it is not necessary to pull out and remove the clamp member 13 from the tool body 11, and it is thus possible to provide a clamp mechanism with high operability. However, in the first embodiment, the male screw portion 13F is formed to have a diameter larger than that of the fitting hole 5, that is, to be the large-diameter portion 13E of the clamp member 13 having a diameter larger than that of the shaft portion 13A. However, the male screw portion 13F may have a diameter equal to or smaller than that of the shaft portion 13A only in order to clamp the tip body 1, that is, the large-diameter portion 13E may not be formed in the clamp member 13. In addition, even when the large-diameter portion 13E is provided, the large-diameter portion 13E may have a diameter smaller than that of the fitting hole 5, if only it comes in contact with side surface 2B or the inside of the fitting hole 5 so as to push up the tip body 1 when the male screw portion 13F is loosened.

Figure 8:
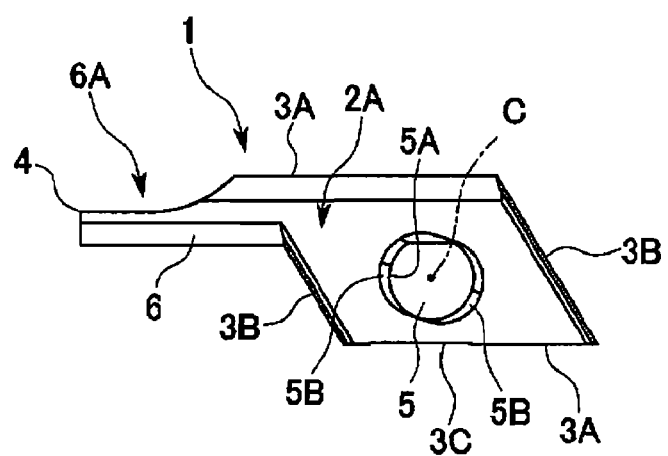
FIG. 8 is a lateral view of a clamped tip according to a second embodiment of the invention.
Figure 9:
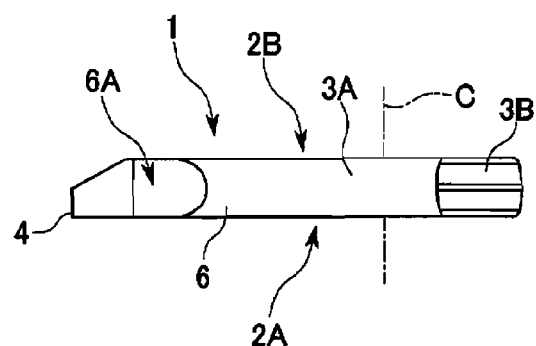
FIG. 9 is a plan view of the tip shown in FIG. 8.

In the first embodiment, the tip in which the cutting edge 4 is formed on the intersection ridgelines at the acute ends of the parallelogram side surfaces 2A and 2B among the intersection ridgelines between four circumferential surfaces 3A and 3B of the tip body 1 substantially having a parallelogram panel shape has been described as the clamped tip. However, the clamp mechanism according to the embodiment is not limited to the above-mentioned tip. For example, FIGS. 8 and 9 illustrate a grooving tip according to a second embodiment which can be fitted to the tool body according to the first embodiment. In the second embodiment and third through fifth embodiments described later, like elements common to the first embodiment are denoted by like reference numerals and description thereof will be simplified or omitted.

In the tip according to the second embodiment, similarly to the first embodiment, an axis-shaped cutting edge portion 6 is protrude from one short circumferential surface 3B of the tip body 1 having a parallelogram shape along the long circumferential surface 3A intersecting each other at an acute end of the side surfaces 2A and 2B, a cut portion 6A is formed on the circumferential surface 3A at the end of the cutting edge portion 6, the upper surface of the cut portion 6A opposed to the circumferential surface 3A serves as a rake face, and the cutting edge 5 is formed on the protruded end. In the tip body 1 according to the second embodiment, unlike the first embodiment, the acute ends of both side surfaces 2A and 2B are not a slope surface, a portion protruded by a step is not formed at the center of the side surface 2B, both side surfaces 2A and 2B are flat planes perpendicular to the thickness direction of the tip body 1 (the direction along the center line C of the fitting hole 5), and the tip body 1 is not symmetrical about the center line C.

Figure 10:
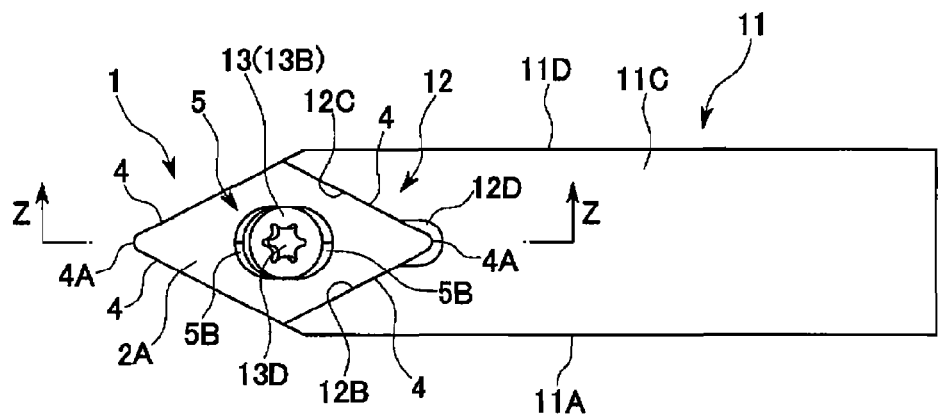
FIG. 10 is a plan view illustrating a throwaway grooving bite employing a clamp mechanism according to a third embodiment of the invention.
Figure 11:
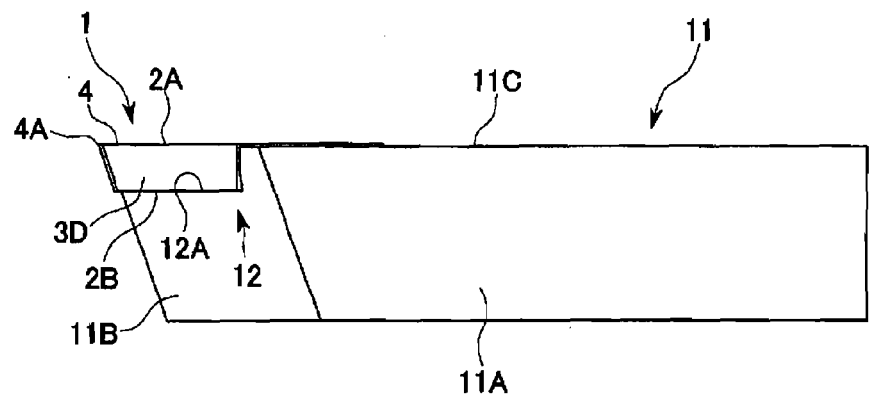
FIG. 11 is a lateral view of the grooving bite shown in FIG. 10.
Figure 12:
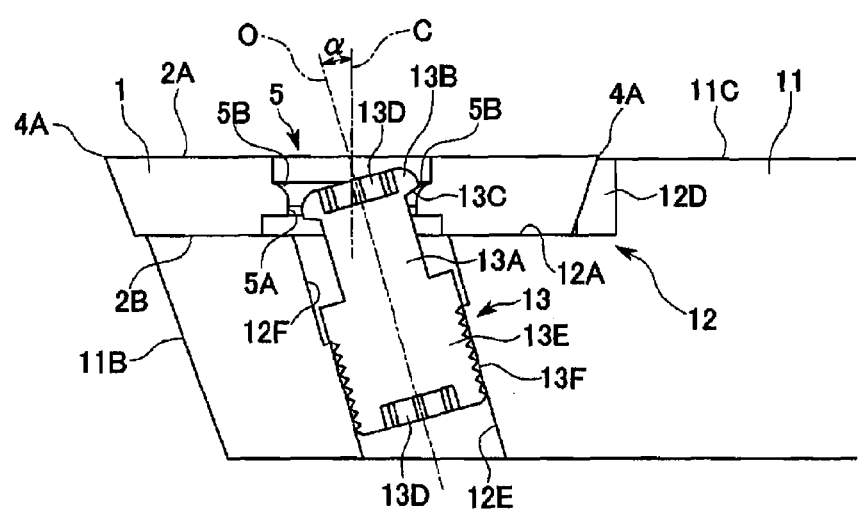
FIG. 12 is a cross-sectional view taken along Line Z-Z of FIG. 10, which illustrates a state in which a tip is clamped according to the third embodiment of the invention.

In the third embodiment shown in FIGS. 10 to 12, the invention is applied to a throwaway turning bite. In the clamped tip according to the third embodiment, the tip body 1 has a rhombus panel shape, one of a pair of rhombus side surfaces 2A and 2B (side surface 2A in the figures) serves as a rake face, the cutting edge 4 having a corner portion 4A at the acute end of the rhombus shape is formed at four ridges, the circumferential surfaces 3D of the tip body 1 extending to the cutting edge 4 serve as the clearance surfaces, and the circumferential surfaces 3D serving as the clearance surfaces are gradually retreated toward the side surface 2B, thereby forming a positive tip having a clearance angle. Accordingly, the side surface 2B serving as a seating surface inside the tip body 1 has a rhombus shape slightly smaller than the side surface 2A serving as the rake face. In the tip body 1 according to the third embodiment, unlike the first embodiment, the fitting hole 5 is not symmetrical about a plane perpendicular to the center line C at the center in the thickness direction of the tip body 1, and the inner circumference of the opening closer to the side surface 2B than to the minimum-diameter portion 5A has a counterbore hole shape having an inner diameter larger than that of the contact portion 5B.

In the third embodiment, the tool body 11 by which the tip is clamped has a rectangular pillar shape like the first embodiment, but the end surface 11B has a triangular gable shape corresponding to the acute corner of the rhombus of the tip body 1. In addition, as described above, the tool body is gradually retreated as it goes apart from the upper surface 11C to correspond to the clearance angle given to the circumferential surfaces 3D serving as the clearance surface of the positive tip body 1, and the tip fitting seat 12 is opened toward the end surface 11B at the end of the upper surface 11C. The tip fitting seat 12 includes a fitting seat bottom 12A having a rhombus shape equal to but smaller than the side surface 2B serving as the seating surface of the tip body 1 and a pair of fitting seat walls 12B and 12C which are raised from the ridge on the end side of the tool body 11 in the rhombus of the fitting seat bottom 12A toward the upper surface 11C and in which a portion close to the upper surface 11C is tilted to correspond to the clearance angle given to the circumferential surface 3D. In the screw hole 12E into which the clamp member 13 is inserted, the portion close to the fitting seat bottom 12A is formed in a shaft portion 12F having a diameter slightly larger than a female screw portion, as illustrated in FIG. 12.

Figure 13:
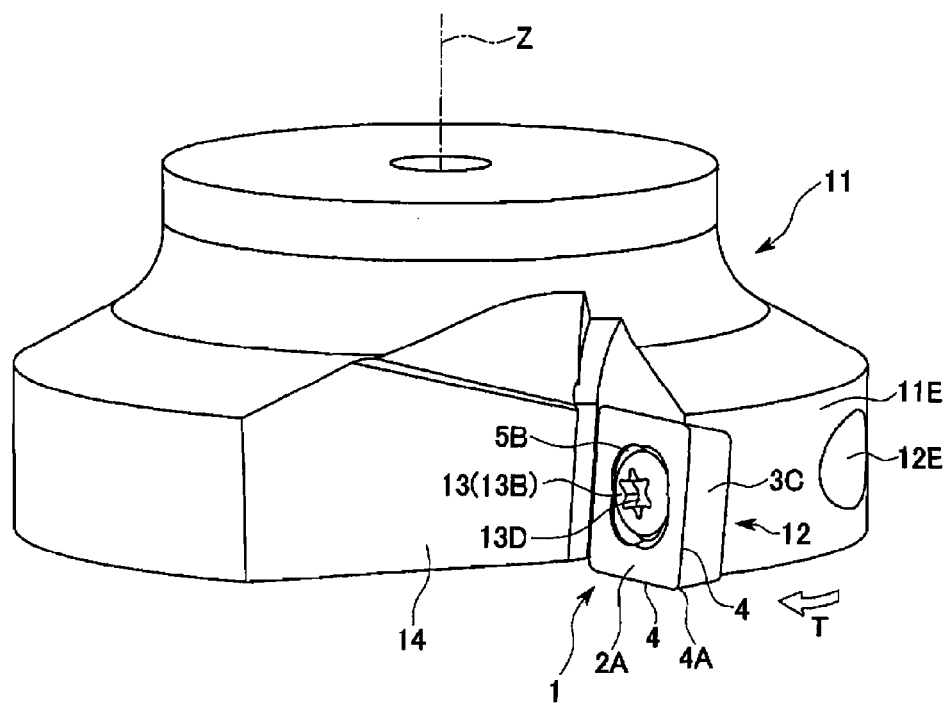
FIG. 13 is a perspective view illustrating a throwaway face mill employing a clamp mechanism according to a fourth embodiment of the invention.
Figure 14:
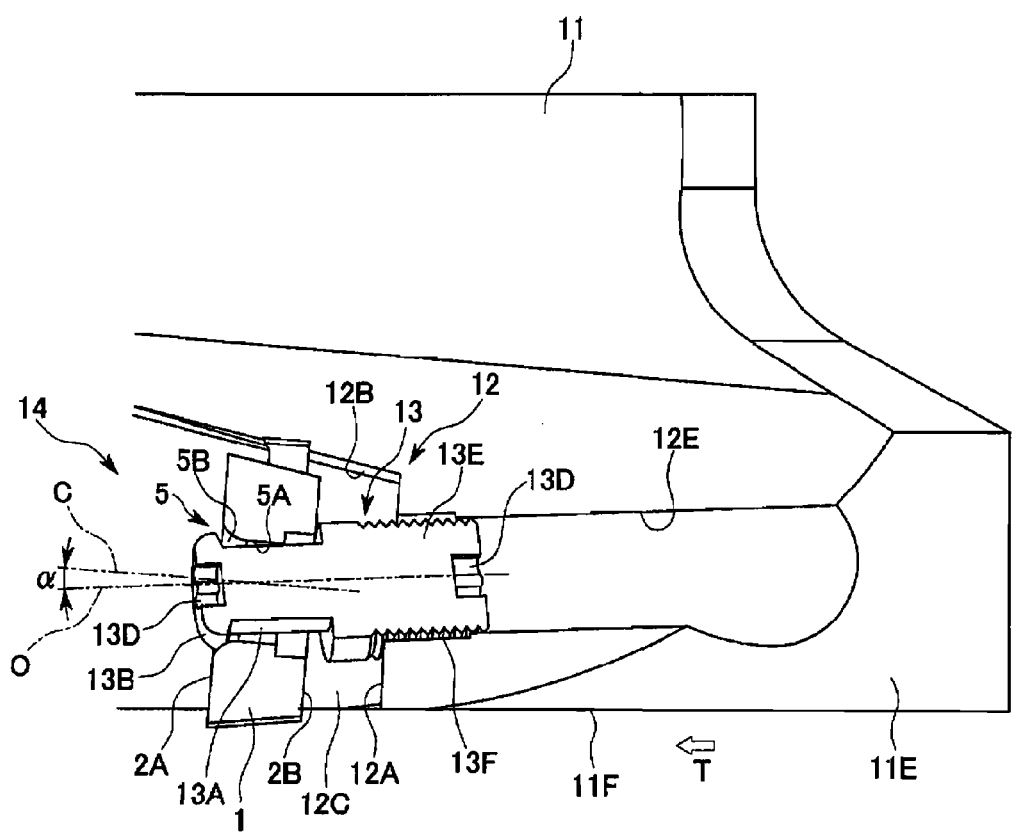
FIG. 14 is a partially exploded lateral view illustrating a state in which a clamp member of the face mill shown in FIG. 13 is loosened.
Figure 15:
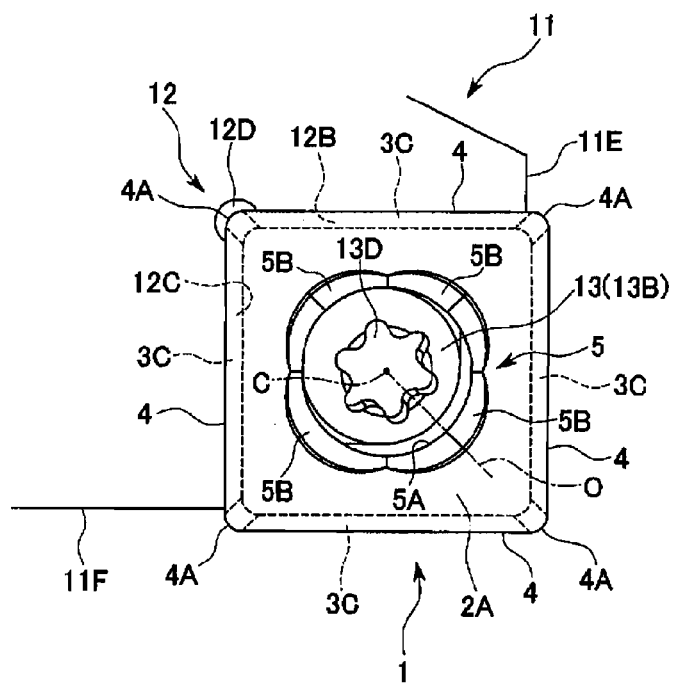
FIG. 15 is a lateral view of a clamped tip in the face mill shown in FIG. 13 as seen from a side surface.

On the other hand, the clamp mechanism according to the invention can be applied as a tip clamp mechanism of a throwaway turning tool such as a front milling tool like the fourth embodiment shown in FIGS. 13 to 15, in addition to the throwaway cutting tool like the first through third embodiments. Here, the tool body 11 of the front milling tool has substantially a disk shape centered on the axis line Z and rotates in the rotation direction T at the time of cutting. A tip pocket 14 is formed in a concave shape on the outer circumference, a tip fitting seat 12 is formed in the wall of the tip pocket 14 directed to the rotation direction T so as to be open to the outer circumferential surface 11E and the lower surface 11F of the tool body 11, and the tip body 1 is clamped and fitted by the use of the clamp mechanism according to the fourth embodiment. Generally, a plurality of tip pockets 14, a plurality of tip fitting seats 12, a plurality of tip bodies 1, and a plurality of tip clamp mechanisms are installed with a gap in the circumferential direction of the tool body 11, but only one is shown in the embodiment and others are omitted.

Here, in the tip according to the fourth embodiment, the tip body 1 has substantially a square panel shape as shown in FIG. 15, the cutting edges 4 having a corner portion 4A at the edges of the side surface 2A are formed at four ridges of the square side surface 2A serving as the rake face, and a positive tip is formed in which a clearance angle is given to four circumferential surfaces 3D thereof like the third embodiment. Accordingly, by sequentially revolving the tip body 1 around the center line C and fitting again the tip body so as to locate the corner R portion 4A on the outer circumference of the lower surface 11F of the tool body 11, the cutting edges 4 can be used four times in one tip body 1. Correspondingly, as the contact portion 5B formed in the opening of the fitting hole 5 close to the side surface 2A, as shown in FIG. 15, four contact portions 5B forming a crescent shape as seen in the direction along the center line C are formed with a constant gap on the circumference of the minimum-diameter portion 5A to form a petal shape, and the back surface 13C of the head portion 13A of the clamp member 13 comes in contact with the contact portions 5B located on the side opposite to the corner portion 4A of the cutting edge 4 used for cutting in the diagonal line of the side surface 2A, thereby clamping the tip body 1.

Figure 16:
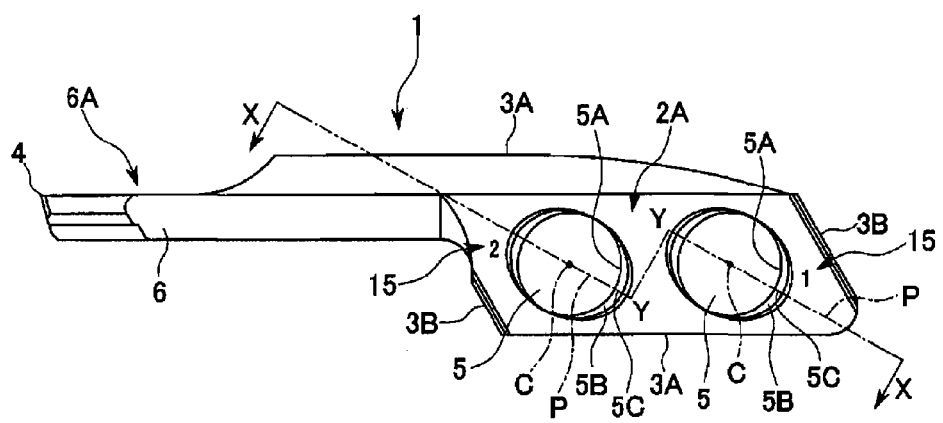
FIG. 16 is a lateral view of a clamped tip according to a fifth embodiment of the invention.
Figure 17:
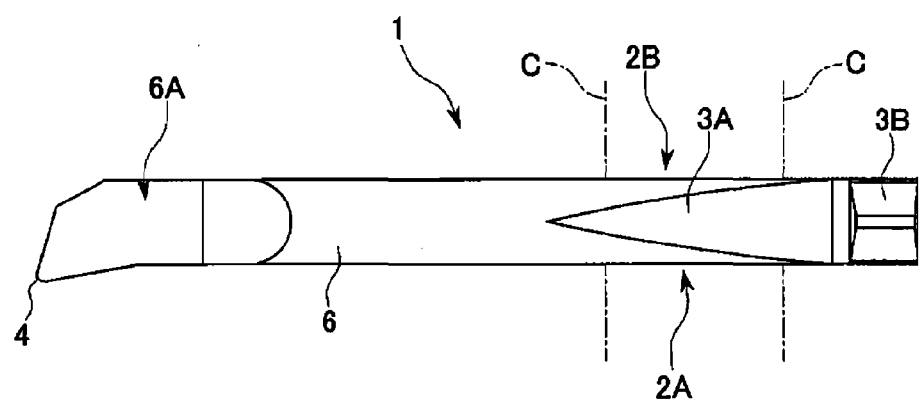
FIG. 17 is a plan view of the tip shown in FIG. 16.
Figure 18:
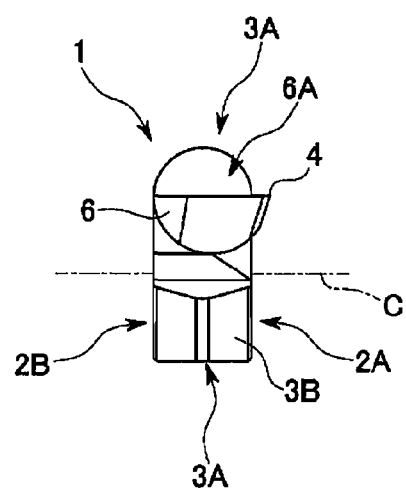
FIG. 18 is a front view of the tip shown in FIG. 16.
Figure 19:
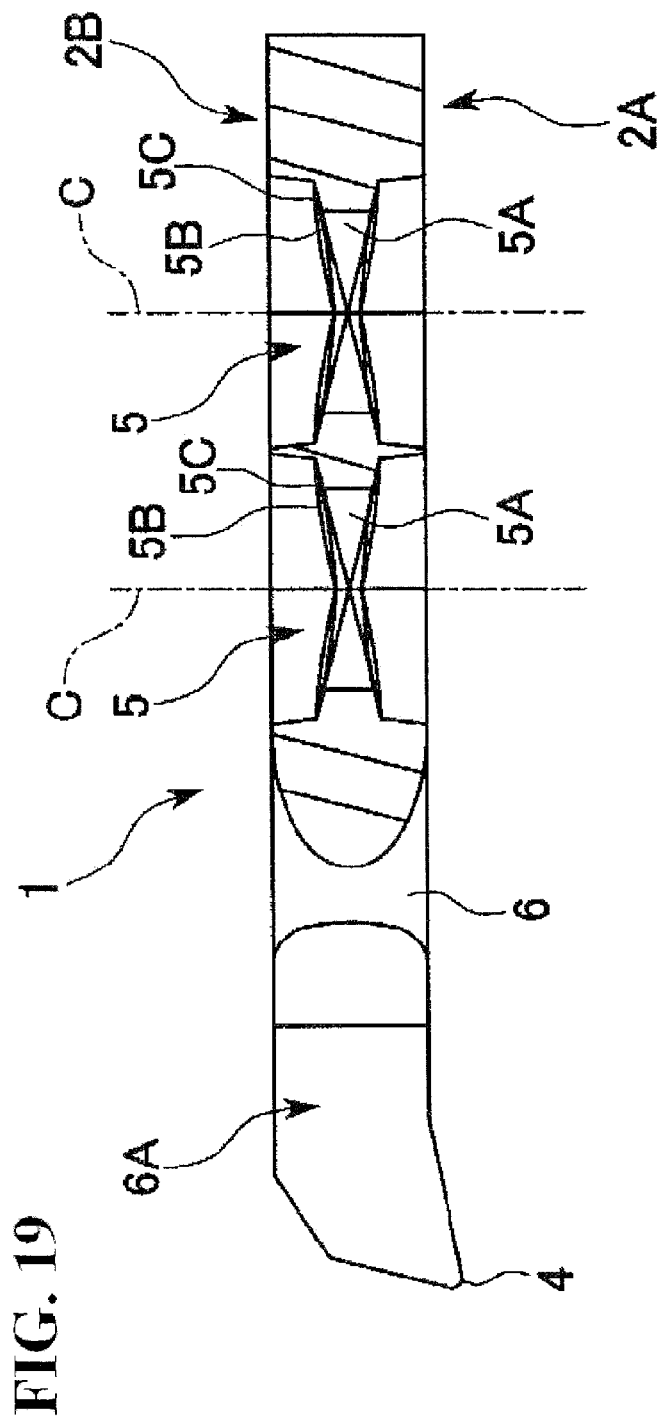
FIG. 19 is a cross-sectional view taken along Line X-Y-Y-X of FIG. 16.
Figure 20:
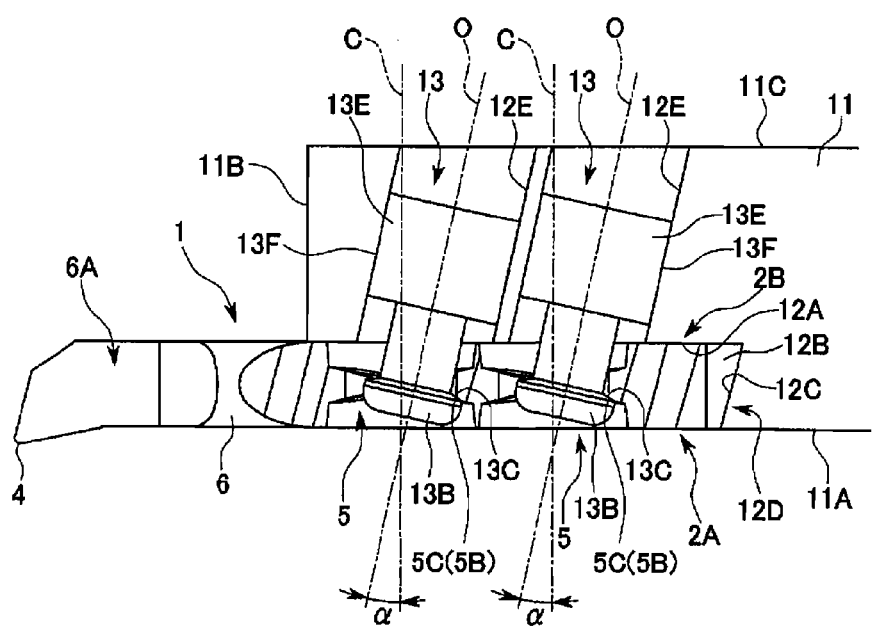
FIG. 20 is a cross-sectional view of a throwaway bite employing a clamp mechanism according to the fifth embodiment of the invention, which corresponds to the section taken along Line X-Y-Y-X of FIG. 16.

FIGS. 16 to 20 illustrate the fifth embodiment of the invention. Similarly to the tip according to the second embodiment shown in FIGS. 8 and 9, the tip according to the fifth embodiment has a structure that the axial cutting edge portion 6 is protruded along the longitudinal circumferential surface 3A from the short circumferential surface 3B of the tip body 1 having substantially parallelogram panel shape and the cutting edge 4 is formed at the end thereof and is used to perform the inner-diameter machining process to a lower opening formed in a workpiece. In the fifth embodiment, as shown in FIGS. 16 and 19, a plurality of fitting holes 5 (two in the embodiment) is formed in the tip body 1, and a plurality of clamp members 13 (two in the embodiment) are provided in the tip fitting seat 12 of the tool body 11 to correspond to the fitting holes 5.

Here, the fitting holes 5 are formed in parallel to each other in the direction in which the circumferential surface 3A extends (in the horizontal direction in FIG. 16) as shown in FIG. 16 so that the fitting holes 5 extend in the thickness direction of the tip body 1 in the state where the center lines C thereof are parallel to each other as shown in FIG. 19, and the contact portions 5B having a substantially crescent shape as seen from the side surface 2A of the tip body 1 are formed in the fitting holes 5, respectively. In the embodiment, similarly to the first through third embodiments, the openings of the fitting holes 5 have an elliptical shape as seen in the direction along the center lines C, but in the contact portions 5B according to the embodiment, the section taken along the center line C does not form a convex quarter circular shape, unlike the first through fourth embodiments. In the section, the contact portion 5B is formed substantially in a straight line shape directed to the side surface 2B with a constant slope as it goes toward the inner circumference of the fitting hole 5 from the side surface 2A of the tip body in which the corresponding contact portion is formed as shown in FIG. 19.

As shown in FIG. 19, the slope of a straight line formed by the contact portion 5B in the section containing the center line C (the slope about the plane perpendicular to the center line C) is slowest in the plane P containing the center line C and the major axis of the ellipse and is continuously faster as it goes toward the minor axis around the center line C along the ellipse. As shown in FIG. 19, the position of the straight line in direction along the center line C is gradually retreated toward the side surface 3B from the side surface 2A as it goes toward the minor axis around the center line C from the plane P containing the center line C and the major axis. Accordingly, in the fifth embodiment, the contact portion 5 is most convex in the direction along the center line C in the plane P (in the major axis). In the fifth embodiment, the fitting hole 5 is symmetrical about the plane perpendicular to the center line C at the center in the thickness direction of the tip body 1, similarly to the first embodiment. Accordingly, in the minimum-diameter portion 5A of the fitting hole 5 inside the contact portion 5B, the width in the direction along the center line C is decreased as it goes from the major axis of the ellipse toward the minor axis around the center line C, as shown in FIG. 19.

Two fitting holes 5 formed in the tip body 1 have the same shape and size and as shown in FIG. 16, the major axes of the ellipses are parallel to each other, that is, the planes P are parallel to each other, as seen from the side surface 2A. The major axis of the fitting hole 5 formed at one acute end opposite to the end provided with the cutting edge portion 6 among the acute ends of the parallelogram of the side surface 2A extends toward the intersection between the circumferential surfaces 3A and 3B at one acute end, and the major axis of the fitting hole 5 formed at the other acute end provided with the cutting edge portion 6 extends toward the intersection between the circumferential surfaces 3A and 3B at the other acute end. However, in the fifth embodiment, the intersection at one acute end is chamfered in a circular arc shape smoothly tangential to the circumferential surfaces 3A and 3B.

In the side surface 2A, marks 15 indicating the clamping order at the time of clamping the tip by advancing the clamp members 13 provided corresponding to the fitting holes 5 are provided in the vicinity of the (two) fitting holes 5. The marks 15 are provided as numerals "1" and "2" by inscribing in the side surface 2A the order of clamping the clamp members 13 passing through the adjacent fitting holes 5 by means of a laser marking process. In the embodiment, numeral "1" is marked at one acute end among the acute ends of the parallelogram of the side surface 2A and numeral "2" is marked at the other acute end.

On the other hand, in the fitting seat bottom 12A of the tip fitting seat 12 of the tool body 11, screw holes 12E are formed at positions corresponding to the fitting holes 5 in the state where the tip bodies 1 are fitted. The screw holes 12E are formed so that the central axis lines O of the clamp members 13 inserted into the screw holes 12E are parallel to each other in the plane P containing the center lines C of the fitting holes 5 and the major axes thereof in the fitting state and extend to be apart from the center lines C and to be tilted about the center lines C in the direction directed to one acute end of the tip body 1 as it goes in the advancement direction (the inserting direction of the clamp members 13) of the clamp members 13 toward the tip fitting seat 12.

In the contact portions 5B of the tip body 1 in the fitting state, the portions 5C positioned in the plane P containing the center lines C and the central axis lines O, that is, the portions positioned in the major axis, are slowest in slope about the plane perpendicular to the center line C as described above and are most convex in the direction along the center line C. Accordingly, the portions 5C positioned in the plane P containing the central axis lines O and the center lines C are most convex in the direction along the central axis lines O. Therefore, the back surfaces 13C of the head portions 13B of the clamp members 13 come in contact with the portions 5C positioned in the plane P among the contact portions 5B, as the clamp members 13 are inserted in the direction along the central axis lines O to advance toward the tip fitting seat 12.

In the fifth embodiment having the above-mentioned structure, when the clamp member 13 advances toward the tip fitting seat 12 to clamp the tip, the back surface 13C of the head portion 13B comes in contact with the portion 5C positioned in the plane P in the circumferential direction among the contact portions 5B of the fitting hole 5 of the tip body 1 and presses the tip body 1. Accordingly, for example, in comparison with the case that the back surface 13C of the head portion 13B comes in contact with two positions in the circumferential direction of the contact portions 5B in the first embodiment, it is possible to satisfactorily and stably clamp the tip by efficiently delivering the pressing force without distributing the pressing force of the clamp member 13 (the inserting force resulting from the male screw 13F in the embodiment). Like in the fifth embodiment, when the clamp member 13 is a clamp screw for advancing toward the tip fitting seat 12 and clamping the tip body 1 by inserting the male screw portion 13F into the screw hole 12E, it is possible to prevent the partial wear due to the contact of the back surface 13C with the contact portion 5B at a plurality of positions.

In the fifth embodiment, since a plurality of (two) fitting holes 5 is formed in one tip body 1 and a plurality of (two) clamp members 13 corresponding to the fitting holes are provided in the tip fitting seat 12 of the tool body 11, it is possible to strongly clamp a tip. In the fifth embodiment, since the central axis lines O of the clamp members 13 advancing toward the tip fitting seat 12 are tilted about the center lines C thereof so as to extend parallel to each other as seen in the direction along the center lines C of the fitting holes 5 of the tip body 1, the pressing directions of the clamp members 13 can be arranged in the same direction and thus the circumferential surfaces 3A and 3B of the tip body 1 can contact and strongly press the walls 12B and 12C. Accordingly, it is possible to accurately position and fit the tip body 1 on the tip fitting seat 12 and to position the edge position of the cutting edge 4 of the cutting edge portion 6 protruded to the end of the tool body 11 with high positioning accuracy every time interchanging the tip, thereby preventing in advance the problem that a machining error occurs due to deviation in edge position of the cutting edge 4 before and after interchanging a tip.

In the fifth embodiment, the central axis lines O tilted about the center lines C of the clamp members 13 are parallel to each other as seen in the direction along the center line C, but may extend in the direction intersecting each other as seen in the direction along the center line C if only the intersection angle is 5° or less. However, like in the fifth embodiment, when the circumferential surfaces 3A and 3B of the tip body 1 extending to intersect each other by an acute angle at one acute end as seen in the direction along the center line C are brought into contact with the walls 12B and 12C of the tip fitting seat 12 extending in the directions intersecting each other by an acute angle to fit the tip body 1, the central axis lines O of the clamp members 13 are disposed preferably to intersect each other at one acute end even if the central axis lines extend in the directions intersecting each other as seen in the direction along the center lines C as described above.

In the fifth embodiment, a plurality of fitting holes 5 are formed in the tip body 1, a plurality of clamp members 13 corresponding to the fitting holes are disposed in the tool body 11, and the marks 15 indicating the order of advancing (inserting in the embodiment) the clamp members 13 toward the tip fitting seat 12 are formed in the tip body 1. For example, in the embodiment, as described above, a mark 15 indicated by numeral "1" is formed in the vicinity of the fitting hole 5 close to one acute end of the tip body 1 and located at the intersection between the walls 12B and 12C of the tip fitting seat 12, and a mark 15 indicated by numeral "2" is formed in the vicinity of the fitting hole 5 close to the other acute end opposite thereto. Accordingly, the tip body 1 is first fitted to the tip fitting seat 12, the clamp member 13 of which the shaft portion 13A passes through the fitting hole 5 close to one acute end in the vicinity of the mark 15 indicated by numeral "1" is further inserted thereto, and then the clamp member 13 is inserted into the fitting hole 5 close to the other acute end in the vicinity of the mark 15 indicated by numeral "2", thereby clamping a tip.

As a result, the tip body 1 is strongly pressed in the direction in which the central axis line O is tilted in the extending direction of the plane P, that is, toward the acute end in which the walls 12B and 12C of the tip fitting seat 12 intersect each other by advancing the clamp member 13 of one acute end toward the tip fitting seat 12. Thereafter, the circumferential surfaces 3A and 3B intersecting each other at one acute end come in contact with the walls 12B and 12C as a whole, and then is pressed by the clamp member 13 at the other acute end, thereby strongly fitting the tip body, as described above. Accordingly, it is possible to prevent the following problem: the tip is positioned in the state where the circumferential surface 3A of the tip body 1 and the wall 12B of the tip fitting seat 12 or the circumferential surface 3B and the wall 12C do not come in contact with each other as a whole by first inserting the clamp member 13 passing through the fitting hole at the other acute end, the clamp member 13 at one acute end is then inserted and the clamp member 13 is clamped in this state, the edge position of the cutting edge 4 is not positioned with high accuracy, and the machining accuracy is damaged or the tip becomes unstable, thereby causing a rattle or a detachment in the course of performing the cutting process.

In the embodiment, the marks 15 are formed by inscribing numerals "1" and "2" in the side surface 2A of the tip body 1 by the use of the laser marking. However, for example, the marks may be formed by forming the numerals in the tip body 1 in a concave manner or a convex manner, or by forming the number of protrusions or grooves other than the numerals in the vicinity of the fitting holes 5 to correspond to the numerals.

The invention claimed is:

1. A clamp mechanism of a throwaway tip for pressing a throwaway tip, the clamp mechanism comprising:
   a tool body having a tip body;
   a fitting hole formed through the tip body;
   a tip fitting seat formed in the tool body;
   a contact portion of the tip body formed in an opening of the fitting hole; and
   a clamp member comprising:
      a shaft portion inserted into the fitting hole;
      a head portion which passes through the fitting hole, the head portion having an outer diameter equal to or greater than that of the shaft portion and clamping the throwaway tip to the tip fitting seat by allowing the clamp member to advance toward the tip fitting seat in a central axis direction of the shaft portion; and
      a section of a back surface of the head portion, the section being perpendicular to the central axis direction and having a circle shape centered at the central axis line;
   wherein a part of the back surface of the head portion comes into contact with the contact portion formed in an opening of the fitting hole when the clamp member is allowed to advance.

2. The clamp mechanism according to claim 1, wherein the contact portion of the tip body has a crescent shape which is convex from the inner circumference of the fitting hole toward the outer circumference as seen in the direction along a center line of the fitting hole.

3. The clamp mechanism according to claim 1, wherein the central axis line of the clamp member is tilted with respect to a center line of the fitting hole.

4. The clamp mechanism according to claim 3, further comprising:
   a first portion of the contact portion, the first portion being located in a plane including the central axis line of the clamp member and the center line of the fitting hole, and is more convex in the direction along the central axis line than other portions.

5. The clamp mechanism according to claim 3, further comprising:
   a plurality of fitting holes formed in the tip body, each of the plurality of fitting holes having respective center lines parallel to each other;
   a plurality of clamp members provided in the tool body, each of the plurality of clamp members corresponding to a respective fitting holes; and
   each of the plurality of clamp members having a respective central axis line which extends in a parallel direction or in a direction intersecting each other at an intersection angle of 5° or less as seen in the direction along the center lines.

6. The clamp mechanism according to claim 3, further comprising:
   a plurality of fitting holes formed in the tip body, each of the plurality of fitting holes having a respective center line parallel to each other,
   a plurality of clamp members provided in the tool body, each of the plurality of clamp members corresponding to a respective fitting hole,
   a mark provided in the tip body to indicate an order in which the clamp members advance toward the tip fitting seat.

7. The clamp mechanism according to claim 1, further comprising:
   a screw portion provided at an end of the shaft portion opposite to the head portion in the clamp member, the screw portion being inserted into the tool body,
   wherein the clamp member is allowed to advance toward the tip fitting seat while rotating around the central axis line over the whole circumference.

8. The clamp mechanism according to claim 1, further comprising:
   a large-diameter portion having an outer diameter larger than that of the fitting hole, the large-diameter portion being provided at an end of the shaft portion opposite to the head portion in the clamp member.

9. A clamp mechanism for a milling tool, the clamp mechanism comprising:
   a clamp member having a back surface and a head portion;
   a tool body having a disk shape, the tool body being centered on an axis line of rotation, the tool body comprising:
      an outer circumferential surface; and
      a lower surface;
   a tip pocket formed on an outer circumference of the milling tool, the tip pocket having a concave shape;
   a tip fitting seat formed in a wall of the tip pocket, the tip fitting seat being directed towards the direction of rotation of the milling tool;
   a tip body having a substantially square shape, the tip body comprising a plurality of cutting edges formed at a corner portion of the tip body;

a fitting hole formed through the tip body of the tool body;

a plurality of contact portions formed in the opening of the fitting hole, each of the plurality of contact portions forming a crescent shape as seen in the direction along a center line, wherein a part of the back surface of the head portion of the clamp member contacts a respective one of the plurality of contact portions which is located on a side opposite to a respective cutting edge to clamp the tip body.

10. A clamp mechanism of a throwaway tip for pressing a throwaway tip, the clamp mechanism comprising:

a plurality of fitting holes formed in a tip body of a tool holder, each of the plurality of fitting holes having respective center lines parallel to each other;

a plurality of contact portions of the tip body formed in an opening of the fitting hole; and a plurality of clamp members provided in the tool body, each of the plurality of clamp members corresponding to a respective fitting hole, and each of the plurality of clamp members comprising:

a shaft portion inserted into the fitting hole;

a head portion which passes through the fitting hole, the head portion having an outer diameter equal to or greater than that of the shaft portion and clamping the throwaway tip to the tip fitting seat by allowing the clamp member to advance toward the tip fitting seat in a central axis direction of the shaft portion; and a section of a back surface of the head portion, the section being perpendicular to the central axis direction and having a circle shape centered at the central axis line;

wherein a part of the back surface of a respective head portion comes into contact with the respective contact portion formed in an opening of the fitting hole when the respective clamp member is allowed to advance.

* * * * *